US012608405B2

(12) United States Patent
Karasudha Patnaik et al.

(10) Patent No.: US 12,608,405 B2
(45) Date of Patent: *Apr. 21, 2026

(54) MODEL GENERATION BASED ON MODULAR STORAGE OF TRAINING DATA

(71) Applicant: Citibank, N.A., New York, NY (US)

(72) Inventors: Sanakar Narayan Karasudha Patnaik, Maharashtra (IN); Akshay Jain, Maharashtra (IN)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/977,755

(22) Filed: Dec. 11, 2024

(65) Prior Publication Data

US 2025/0315453 A1     Oct. 9, 2025

Related U.S. Application Data

(63) Continuation of application No. 18/626,957, filed on Apr. 4, 2024, now Pat. No. 12,182,180.

(51) Int. Cl.
G06F 16/28          (2019.01)

(52) U.S. Cl.
CPC ................................. G06F 16/287 (2019.01)

(58) Field of Classification Search
CPC ................................................... G06F 16/287
See application file for complete search history.

(56) References Cited

U.S. PATENT DOCUMENTS

| | | | |
|---|---|---|---|
| 12,073,078 B2 * | 8/2024 | Shroff | G06F 3/0637 |
| | | | 707/737 |
| 12,182,180 B1 * | 12/2024 | Karasudha Patnaik | |
| | | | G06F 16/287 |
| | | | 707/737 |
| 2020/0019311 A1 * | 1/2020 | Zolotow | G06F 3/067 |
| | | | 707/737 |
| 2020/0034746 A1 * | 1/2020 | Poitras | G06F 11/302 |
| | | | 707/737 |
| 2022/0172099 A1 * | 6/2022 | Das | G06N 20/00 |
| | | | 707/737 |
| 2022/0383859 A1 * | 12/2022 | Mimassi | G10L 15/16 |
| | | | 707/737 |
| 2023/0011315 A1 | 1/2023 | Kaitha | |
| 2023/0076433 A1 * | 3/2023 | Pathak | G06F 30/27 |
| | | | 707/737 |

(Continued)

*Primary Examiner* — Yuk Ting Choi
(74) *Attorney, Agent, or Firm* — Perkins Coie LLP

(57)          ABSTRACT
The model generation platform enables generation of machine learning models based on modular storage of user-specified training data. The platform can obtain a dataset from a different heterogenous source (e.g., a structured database, an unstructured database, a semi-structured file system, manual upload of a comma-separated value file, a spreadsheet, and/or big data) through an associated application programming interface and store this data in a first storage medium. The model generation platform can obtain an indication of a portion of the dataset from a user via a user interface and determine a second storage medium for this portion of the dataset based on an associated estimated performance metric. In response to a request for generation of a machine learning model, the model generation platform can generate a machine learning model using training data comprising a subset of the portion of the dataset.

20 Claims, 8 Drawing Sheets

(56)  References Cited

U.S. PATENT DOCUMENTS

| | | |
|---|---|---|
| 2023/0131916 A1 | 4/2023 | Elbaz et al. |
| 2023/0139783 A1 | 5/2023 | Garib et al. |
| 2023/0229735 A1 | 7/2023 | Jain et al. |
| 2023/0244721 A1 | 8/2023 | Miller |
| 2024/0119364 A1 | 4/2024 | Jain et al. |

* cited by examiner

200

| Input component(s) 204 | Network connection component(s) 216 |
| Output component(s) 206 | Persistent storage(s) 218 |
| Processor(s) 208 | Computer-readable media drive(s) 220 |

Storage(s) 210

Application(s) 212

| Application 212a | Application 212b | ... | Application 212n |

Model(s) 214

| Model 214a | Model 214b | ... | Model 214n |

600

⬆ Data Upload ⅏ Data Exploration ⚛ Data Imputation ▤ Data Science Data Operations Tab Insurance Visualization
DATA
Analyse Visualization
Format Selector
612

⊙ Piechart ⊙ Barcharts ⟋ Line

Visualization
614a sex

⊙ female ⊙ male

Visualization
614b smoker

⊙ yes ⊙ no

Visualization
614c region

○ southwest ⊙ southeast ● northwest ○ northeast

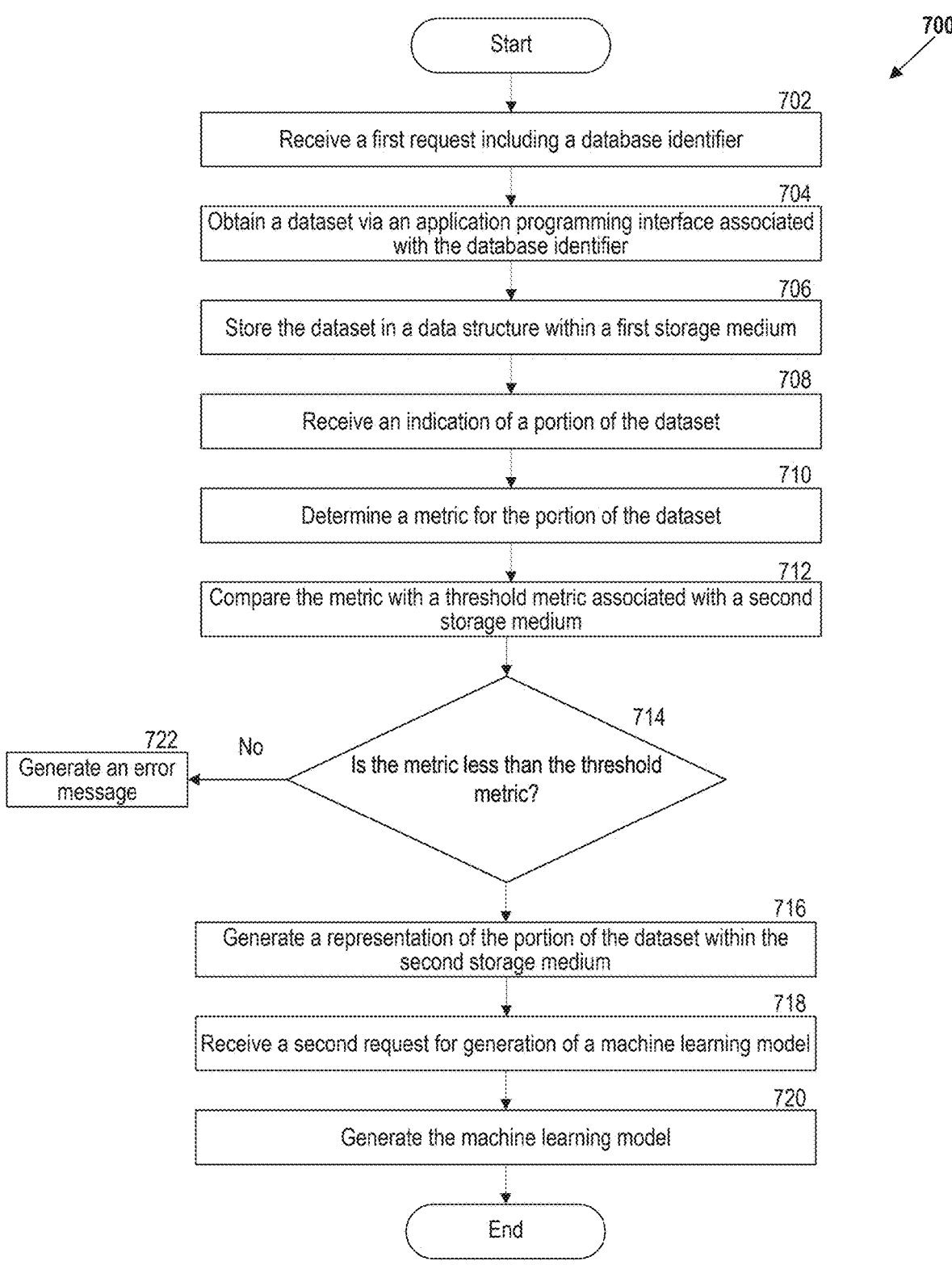

700

Start

702
Receive a first request including a database identifier

704
Obtain a dataset via an application programming interface associated with the database identifier 706
Store the dataset in a data structure within a first storage medium 708
Receive an indication of a portion of the dataset 710
Determine a metric for the portion of the dataset 712
Compare the metric with a threshold metric associated with a second storage medium 714
Is the metric less than the threshold metric?

No

722
Generate an error message

716
Generate a representation of the portion of the dataset within the second storage medium 718
Receive a second request for generation of a machine learning model 720
Generate the machine learning model End

*FIG. 7*

MODEL GENERATION BASED ON MODULAR STORAGE OF TRAINING DATA

CROSS-REFERENCE TO RELATED APPLICATIONS

This application is a continuation of U.S. patent application Ser. No. 18/626,957, filed Apr. 4, 2024 (now U.S. Pat. No. 12,182,180, issued Dec. 31, 2024). The content of the foregoing application is incorporated herein in its entirety by reference.

BACKGROUND

In computing, a pipeline, also known as a data pipeline, can include a set of data processing elements connected in series, where the output of one element is the input of the next one. The elements of a pipeline are often executed in parallel or in a time-sliced fashion. Some amount of buffer storage is often inserted between elements. To be effectively implemented, data pipelines may use a central processing unit (CPU) scheduling strategy to dispatch work to the available CPU cores. Data pipelines may use data structures on which the pipeline stages can operate. For example, an operating system may pipeline commands between various processes' standard input-output systems, using the pipes implemented by the operating system. Lower-level approaches may rely on the threads provided by the operating system to schedule work on stages of the pipeline; both thread pool-based implementations or on a one-thread-per-stage may be viable. Other strategies relying on cooperative multitasking may not use multiple threads of execution and hence additional CPU cores. For example, data pipelines may use a round-robin scheduler with a coroutine-based framework. In this context, each stage may be instantiated with its own coroutine, yielding control back to the scheduler after finishing its round task. This approach may need careful control over the process's stages to avoid them abusing their time slice.

BRIEF DESCRIPTION OF THE DRAWINGS

FIG. 7 shows a flow diagram illustrating a process for generating a machine learning model based on heterogeneous input data based on performance-dependent storage of selected data, in accordance with some implementations of the present technology.

DETAILED DESCRIPTION

Figure 1:
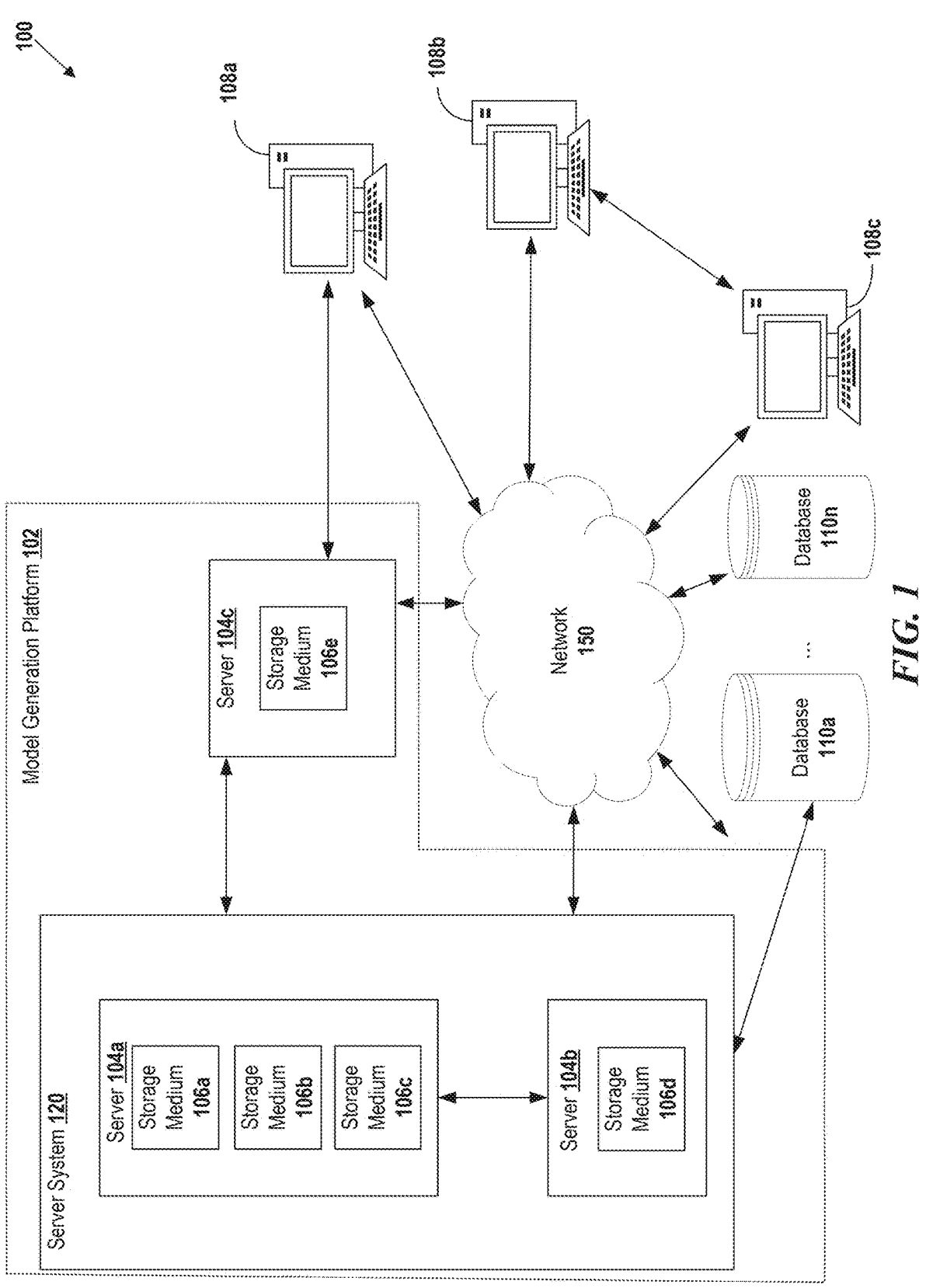
FIG. 1 shows an illustrative environment for a model generation platform for the processing of heterogeneous input data, in accordance with some implementations of the present technology.

Pre-existing systems for the generation, training, configuration, and/or evaluation of machine learning models may include various data sources, components, or pipelines developed by different users (e.g., software developers, data engineers, etc.), such as in a collaborative setting. For example, users may seek to develop or train machine learning models to process, predict, or analyze data from various sources or formats. Data associated with a given data source may have different uses, applications, or relevance to different users and/or target machine learning models, thereby complicating the processing of training data in order to configure these models. Moreover, pre-existing model generation systems may require manual input, imputation, and processing of data originating from different sources or with different formats. Users may require different subsets or slices of such data in order to train or generate the desired machine learning model. As such, pre-existing model generation systems may require inefficient, manual processing of heterogeneous data for generation of the machine learning model. Furthermore, in such model generation systems, data arising from different sources may not be easily visualized due to the heterogeneous nature of underlying data structures. Thus, pre-existing model generation systems may require developers to generate bespoke data visualization modules to aid in data selection for model training, leading to inefficiencies in model development.

Furthermore, pre-existing model generation systems may not effectively handle multiple requests for processing, modifying, or using the same data. For example, multiple users may request to generate or train a machine learning model using data (e.g., particular columns or rows of tabulated data) arising from the same data source. Each user may modify the dataset in a different manner (e.g., by handling null values with different algorithms). As such, a pre-existing model generation system may retrieve and/or generate duplicate versions of a dataset for each associated machine learning model to be generated or trained, thereby increasing data storage requirements and affecting system performance. For example, in some cases, a pre-existing model generation system may retrieve an additional copy of a dataset from the associated source database in response to each user request for the associated data, leading to increased data storage and data transmission (e.g., bandwidth) requirements. As such, pre-existing machine learning model generation systems may encounter issues relating to the scalability of dataset size and/or the number of machine learning model generation requests. Moreover, such pre-existing systems may store such datasets within memory (e.g., a hard disk drive (HDD) or solid-state drive (SSD)) configured to handle large or numerous datasets to handle these quantities of retrieved data; however, such memory may be inefficient and slow compared to more accessible memories (e.g., random access memory (RAM) devices). As such, pre-existing systems may not effectively enable processing and configuration of training data for machine learning model generation and testing.

The disclosed model generation platform enables the intake of datasets of multiple sources and/or formats for generating, training, testing, and/or modifying machine learning models. For example, the model generation platform receives, via a graphical user interface, a request to generate a machine learning model based on data that is associated with a particular data source (e.g., a source database that is accessible via an application programming interface (API)). Based on this data, the system stores a subset of the dataset (e.g., according to the user's machine learning model generation request) within a suitable storage medium according to the storage medium's performance attributes based on information characterizing the performance requirements of the data to be utilized and processed. As such, the system generates a representation of the dataset within this storage medium (e.g., a memory device), where the representation is consistent with the user's request for generation of a machine learning model. For example, the model generation platform stores particular columns of data that are relevant to the model generation request. In some implementations, the model generation platform enables data visualization and selection via a graphical user interface, conferring improved flexibility and accuracy with respect to model generation. The system further enables generation, tuning, or training of a machine learning model based on this stored data, thereby enabling the streamlined model development from heterogeneous data sources.

The disclosed model generation platform enables the intake of data associated with heterogeneous data sources in a streamlined manner, in response to a request for generation of a machine learning model. For example, the system can receive datasets associated with varying databases and/or formats and store data relevant to the model generation request within an accessible storage medium (e.g., associated with the system's RAM) according to associated performance requirements associated with the data. By doing so, the system improves the speed and reduces latency associated with accessing and manipulating the stored data, while enabling user-defined flexibility of the data that is to be stored and processed. Furthermore, the system enables generation of a machine learning model according to data selected by the user (e.g., through a GUI associated with data selection or slicing) while enabling other users to manipulate the same data in a different manner (e.g., for generation of different machine learning models with different target applications).

As such, the model generation platform enables streamlined machine learning model configuration based on data selection and storage using a GUI, thereby improving the accessibility of machine learning model generation in a low-code environment. Furthermore, the model generation platform enables the storage and processing of training data within subsystems that are associated with particular system architectures, applications, or users, thereby enabling the parallel processing of data of the same source. For example, by storing modified or processed training data within an application-specific storage medium (e.g., within the RAM of a particular graphical processing unit (GPU) system), the model generation platform enables the parallel processing of the same data across different subsystems (e.g., across different users), improving the modularity and flexibility of training data intake, visualization, and preparation.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Model Generation Platform

FIG. 1 shows an illustrative environment 100 for a model generation platform 102 for the processing of heterogeneous input data, in accordance with some implementations of the present technology. For example, the model generation platform 102 includes a server system 120 that includes one or more servers (e.g., server 104a and/or server 104b). Servers may be associated with associated storage media (e.g., a storage medium 106a, a storage medium 106b, a storage medium 106c and/or a storage medium 106d). The model generation platform 102 may be associated with multiple servers and/or server systems (e.g., server 104c, associated with storage medium 106e). The model generation platform 102 may interface with and/or include one or more client devices (e.g., client devices 108a, 108b, and/or 108c). In some implementations, the server system 120 and server 104c can be associated with various hardware devices that are capable of communicating via a network 150. Network 150 can enable communication between servers, server systems, one or more client devices (e.g., client devices 108a, 108b, and/or 108c), and/or any combination of systems thereof. For example, as described in relation to FIG. 3, a network can include wired or wireless networks that enable communication between various components associated with the model generation platform.

The model generation platform can include a server system. A server system (e.g., the server system 120) can include systems (e.g., servers) configured to communicate with client devices (e.g., via the network 150). For example, the server system 120 can include an edge server that receives client requests and coordinates fulfillment of those requests through associated servers (e.g., server 104a or server 104b). In some implementations, the server system 120 includes one or more computing systems (e.g., each of which corresponding to a server). Additionally or alternatively, a server associated with the server system 120 can include or be distributed across various computing devices (e.g., as in a cloud server and/or a virtual machine). Servers can be isolated (e.g., physically or through software, such as firewalls) from other servers or server systems. For example, the server 104c can be physically separated from the server system 120. In some implementations, a server can communicate with other components of the model generation platform 102, including databases 110a-110n, client devices 108a and/or 108b, and/or other servers or server systems (e.g., via the network 150 and/or via direct wired or wireless connections).

Components associated with the model generation platform 102 can include storage media. A storage medium can include one or more devices configured to store information, data, or electronic (e.g., digital) resources. A storage medium can be associated with one or more servers, server systems, databases, or other components associated with the model generation platform 102. For example, a storage medium includes primary storage (e.g., main memory, internal memory, or prime memory), such as memory directly accessible to the CPU. Primary memory can include RAM, which can include volatile (e.g., dynamic RAM or static RAM) and/or non-volatile devices (e.g., read-only memory or NOR flash).

Additionally or alternatively, a storage medium includes secondary storage (e.g., external memory or auxiliary storage). Secondary storage can be indirectly accessible by the CPU (e.g., via wired or wireless connections). For example, secondary storage includes hard disk drives (HDDs), solid-state drives (SSDs), Universal Serial Bus (USB) flash drives, floppy disks, magnetic tape, paper tape, or RAM disks. Storage media can include formatting requirements (e.g., associated with a particular file system format). Storage media can include or be associated with performance-related metrics (e.g., threshold metrics) that characterize performance or other attributes associated with the respective media. Additionally or alternatively, a storage medium associated with a computing system includes tertiary storage (e.g., associated with physical separation between the medium and the associated computing system). For example, tertiary storage includes nearline storage, cloud-based storage, tape libraries, mountable HDDs, or other suitable storage.

For example, a storage medium can be associated with one or more threshold metrics (e.g., associated with the medium's performance). A threshold metric can include an indication of requirements, attributes, limitations, or properties associated with the storage medium. For example, the threshold metric includes a maximum storage size (e.g., in bytes) associated with the storage medium. Additionally or alternatively, the threshold metric includes performance-related metrics or values, such as indications of storage latency, estimated or maximum read/write speeds, volatility, maximum storage size, remaining available storage, cost (e.g., price per space and/or price per unit), security features associated with the storage medium, file system formats, and/or other suitable limitations associated with the storage medium. In some implementations, the primary storage media (e.g., RAM) of a given server (e.g., the storage medium 106a) is associated with a lower threshold metric (e.g., a lesser maximum storage size) than secondary storage media (e.g., an HDD, such as the storage medium 106b). The model generation platform 102 enables determination (e.g., dynamically) of threshold metrics associated with storage media for determination of storage of data (e.g., associated with the generation, training, or modification of a given machine learning model). For example, the model generation platform 102 enables determination of whether selected data is compatible with a given storage medium, as discussed in relation to FIG. 4.

The server system 120 (and/or other servers associated with the model generation platform 102) can interface with and/or communicate with one or more databases (e.g., the databases 110a-110n). A database (e.g., the database 110a) can include an organized collection of data or a data store (e.g., based on the use of a database management system). A database can include stored information associated with a third party (e.g., associated with computational devices external to the model generation platform 102). As an illustrative example, computing devices associated with the server system 120 (e.g., using one or more processors of the computing devices) access, retrieve, or extract data from a database (e.g., via an API). For example, the server system 120 can use an API call to an API associated with or specific to a target database for retrieval of associated information (e.g., on the basis of a model generation request from a user). The database can be associated with a database identifier (e.g., to identify or specify the associated API call), which can include a numerical or alphanumeric indication that is unique to a given database. Information retrieved from databases can be associated with one or more data formats (e.g., as discussed in relation to FIG. 4). In some implementations, the user requests retrieval of information from more than one database (e.g., with more than one format or structure). In some implementations, the server system 120 and/or other servers (e.g., server 104c) can include and/or be associated with databases. The model generation platform 102 enables handling, processing, modification, and storage of such heterogeneous data for generation of the requested machine learning models.

The model generation platform 102 can interface with one or more client devices (e.g., user devices). A client device can include one or more devices that are capable of generating requests for server systems (e.g., servers 104a, 104b, or 104c). The client device can be associated with one or more users of the model generation platform. For example, a client device can include a computational device capable of communicating with the model generation platform 102 (e.g., via the network 150). Examples of client devices include laptops, tablets, desktop computers, mobile devices, smartwatches, virtual reality/augmented reality goggles, and/or other wearable or personal devices. The client device can generate and/or transmit requests (e.g., requests for the generation of a machine learning model and/or for retrieval of specified data). The client device can be associated with a user interface (e.g., including a screen, input/output peripherals, and/or other suitable components). For example, the client device displays a GUI that enables interaction (e.g., selection of commands or data) with the associated server systems (e.g., the model generation platform 102) via a visualization or another graphical medium. For example, the GUI enables the display of and/or interaction with data plots, user controls (e.g., toggles, buttons, or drop-down menus), or other suitable functionalities. As such, the client device enables complex operations (e.g., data analysis, visualization, and/or the generation of machine learning models) in a low-code or no-code manner, thereby streamlining data operations.

Suitable Computing Environments

Figure 2:
FIG. 2 shows a block diagram showing some of the components typically incorporated in at least some of the computer systems and other devices on which the disclosed system operates in accordance with some implementations of the present technology.

FIG. 2 shows a block diagram showing some of the components typically incorporated in at least some of the computer systems and other devices 200 on which the disclosed system (e.g., the model generation platform 102) operates in accordance with some implementations of the present technology. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 206, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 208, including a CPU for executing computer programs, a GPU for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 3:
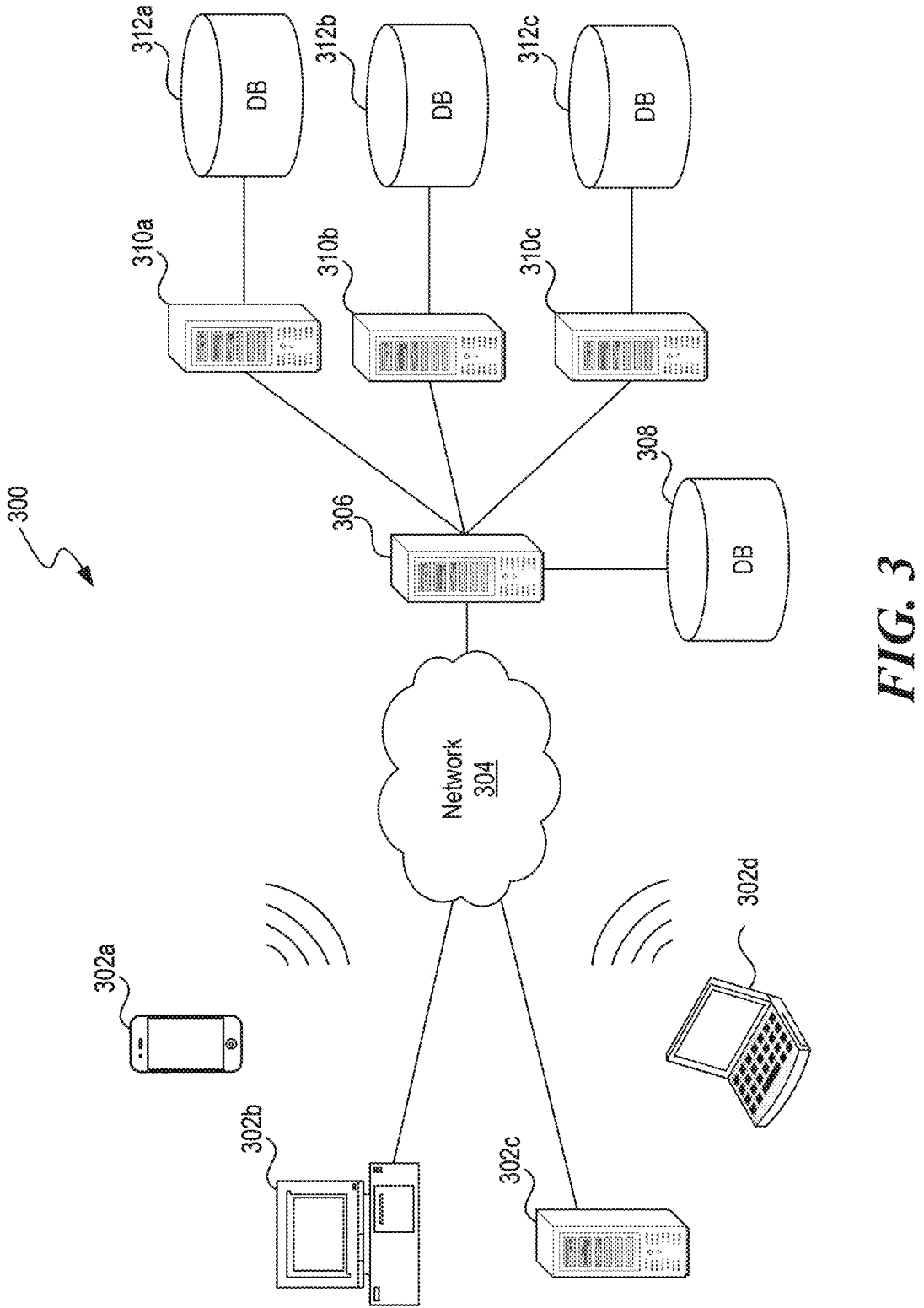
FIG. 3 is a system diagram illustrating an example of a computing environment in which the disclosed system operates in some implementations of the present technology.

FIG. 3 is a system diagram illustrating an example of a computing environment 300 in which the disclosed system operates in some implementations of the present technology. In some implementations, environment 300 includes one or more client computing devices 302*a*-302*d*, examples of which can host graphical user interfaces associated with client devices. For example, one or more of the client computing devices 302*a*-302*d* includes the client devices 108*a*, 108*b*, and/or 108*c*. Client computing devices 302 operate in a networked environment using logical connections through network 304 to one or more remote computers, such as a server computing device (e.g., the server system 120 and/or the server 104*c* of FIG. 1). In some implementations, client computing devices 302 may correspond to device 200 (FIG. 2).

In some implementations, server computing device 306 is an edge server (e.g., which can correspond to the server 104*c* in some implementations), which receives client requests and coordinates fulfillment of those requests through other servers, such as server computing devices 310*a*-310*c* (e.g., including servers 104*a* and 104*b* of the server system 120). In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310*a*-310*c*) connect to a corresponding database (308, 312*a*-312*c*). As discussed above, each server computing device 310 can correspond to a group of servers, and each of these servers can share a database or can have its own database (and/or interface with external databases, such as databases 110*a*-110*n*). Databases 308 and 312 (and/or other databases, such as the databases 110*a*-110*n*) warehouse (e.g., store) information, such as predefined ranges, predefined thresholds, error thresholds, graphical representations, code portions (e.g., predetermined code portions, predetermined code portions corresponding to combinations of nodes and links, policy-controlled code portions), system policies or other policies, templates, JavaScript Object Notation (JSON) templates, JSON objects, computing languages, platform identifiers, data structures, software application identifiers, nodes, links, graphical representations of nodes and links, predetermined data pipeline architectures, default data pipeline architectures, pre-generated data pipelines, data pipelines, transformation components, visual layouts, security-assessment values, computing language identifiers, mathematical formulas (e.g., weighted average, weighted sum, or other mathematical formulas), graphical elements (e.g., colors, shapes, text, images, multimedia), system protection mechanisms, user sections of modular-portions of data pipeline architectures, modular-portions of data pipeline architectures, platform-agnostic modular-portions of data pipeline architectures, machine learning models, AI models, training data for AI/machine learning models, historical information, or other information.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 (e.g., corresponding to the network 150) can be a local area network (LAN) or a wide area network (WAN) but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of LAN, WAN, wired network, or wireless network, including network 304 or a separate public or private network.

Figure 4:
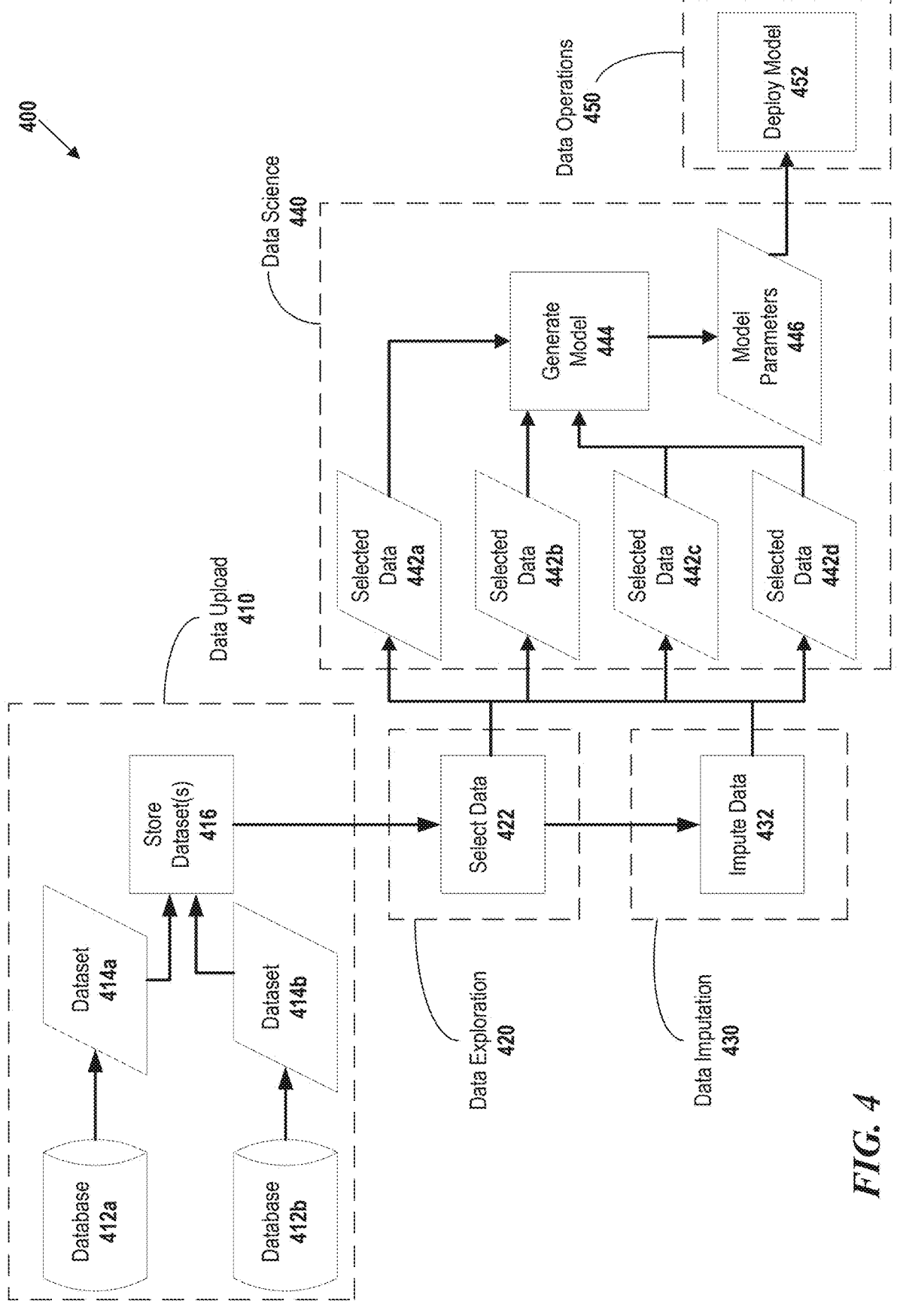
FIG. 4 is a flow diagram illustrating a process for generating/training machine learning models based on heterogeneous input data, in accordance with some implementations of the present technology.

FIG. 4 is a flow diagram illustrating a process 400 for generating/training machine learning models based on heterogeneous input data, in accordance with some implementations of the present technology. For example, the process 400 includes data upload 410 (e.g., of data associated with heterogeneous formats or databases), data exploration 420, data imputation 430, data science 440, and/or data operations 450. As such, the process 400 enables generation and deployment of machine learning models (and/or other data processing operations) based on information from heterogeneous data sources, while enabling low-code visualization and processing of associated data.

Data upload 410 can include retrieval, receipt, and/or extraction of data (e.g., datasets) associated with machine learning models. For example, data upload 410 enables the model generation platform 102 to receive a request from a user for retrieval of data associated with a given database. The model generation platform 102 can receive, via the request, a database identifier that specifies a database from which the data is to be retrieved. For example, the request includes a database identifier for the database 412*a* and/or database 412*b*. The request can include an indication of a subset of the database (e.g., particular columns, rows, records, and/or datasets of the database) specified by the user. Based on this request, the model generation platform 102 can obtain, through an API, the associated dataset (e.g., the dataset 414*a* and/or the dataset 414*b*) and store these datasets within a suitable storage medium associated with the model generation platform 102 (e.g., at the operation 416).

A dataset can include unstructured and/or structured data (e.g., records). For example, a dataset includes information associated with user records (e.g., user accounts, such as bank accounts, credit card accounts, or associated entities). In another example, a dataset includes records, each record of which is associated with a particular entity (e.g., a person). Each record can include demographic information associated with the entity, such as an age, sex, body mass index, number of children, smoking status, region (e.g., geographic region, address, or other location information), and/or associated values (e.g., values of transactions or charges associated with the user). In some implementations, datasets include distinct data formats or structures (e.g., depending on the database from which the respective dataset originates).

A data format can include an indication or a schema of a structure (e.g., a structure type), format, or framework associated with data within a dataset. For example, a data format includes a file format, specifying a structure for presenting or storing information. Structured data consistent with comma-separated value (CSV) format includes records, rows, columns, or other information separated by commas and/or line breaks. In some implementations, data formats include other structures, including JSON, binary, shapefiles, vector files, tab-separated value (TSV), or other suitable file formats (e.g., including image or video file formats). For example, structured data includes Structured Query Language (SQL)-based data. Databases can be associated with particular file formats and/or data structures. Additionally or alternatively, a database includes data and/or datasets of multiple file formats or types of structures.

In some implementations, datasets include unstructured information (e.g., in a file format that is not associated with structured data). For example, the dataset includes data that does not reside in a row-column database (e.g., data including text, dates, numbers, or facts). For example, unstructured data includes information without a pre-determined data model or schema, including text documents, email messages, slide decks, transcripts, web pages, or other such data. Unstructured data can include metadata, natural language (e.g., audio, video, or textual data), and/or information associated with documents (e.g., in a portable document format). As such, the model generation platform 102 enables efficient, flexible, and modular intake of data for machine learning model applications from a variety of databases and of a variety of data formats.

The datasets can include and/or be associated with performance metrics. A performance metric includes an indication of attributes, requirements, limitations, or properties associated with storing a given dataset. A performance metric includes an indication of a storage size (e.g., for a storage medium to suitably store the associated dataset). The performance metric can include an indication of a required bandwidth for transmission of the dataset, security requirements for the storage of such data (e.g., associated with user permission to portions of the dataset). The performance metric can include indications of a required latency for accessing the dataset, associated read/write speeds, and/or other suitable attributes associated with the dataset. For example, the model generation platform 102 determines a storage size required to store a given dataset based on a storage utility/application associated with the server system 120. Additionally or alternatively, the model generation platform 102 can obtain this information characterizing the dataset from an API call associated with the API of the associated database.

The model generation platform 102 can store datasets 414a and/or 414b (e.g., as retrieved from databases) within a storage medium (e.g., as described in relation to FIG. 1). Additionally or alternatively, the model generation platform 102 stores subsets of these datasets according to one or more user requests (e.g., a request to generate a machine learning model). In some implementations, the model generation platform 102 can store the data in a pre-determined location (e.g., as associated with the server system 120, such as within a storage medium 106a). As an example, the storage medium includes an HDD or an SSD (e.g., secondary storage) that is capable of storing large amounts of data (e.g., greater amounts/sizes of data than primary storage associated with the server system 120). The storage medium can store a particular dataset within a storage medium specified by a user.

Figure 5:
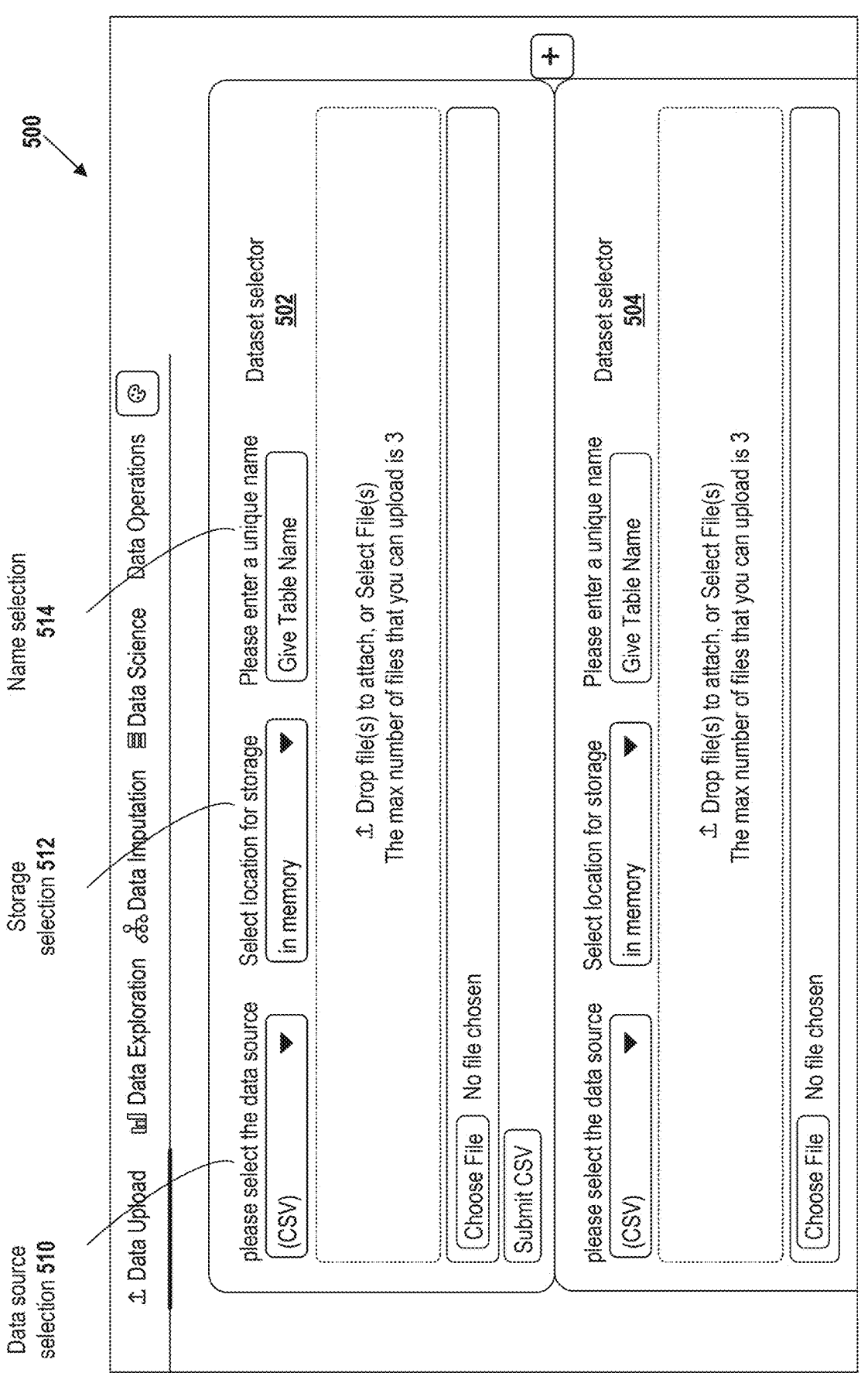
FIG. 5 shows an illustrative representation of a GUI for generating machine learning models based on heterogeneous input data, in accordance with some implementations of the present technology.

For example, FIG. 5 shows an illustrative representation of a GUI 500 for generating machine learning models based on heterogeneous input data, in accordance with some implementations of the present technology. As an illustrative example, FIG. 5 includes multiple interfaces for the selection of multiple datasets (e.g., the dataset selector 502 and the dataset selector 504).

A graphical representation of a data selector can include a user control for data source selection 510, storage selection 512 (e.g., for user selection of a storage medium), and/or name selection 514. For example, data source selection 510 enables selection of a dataset and/or a database for generation of the machine learning model (e.g., via an associated API), as described above. Data source selection 510 can include a user control, such as a drop-down menu of a variety of data sources and/or data formats for the associated dataset. Storage selection 512 enables selection of a storage medium for storage of the associated dataset. For example, the storage selection 512 includes a drop-down menu for user selection of a particular storage medium associated with a particular server and/or server system. Name selection 514 enables determination of a name for the dataset (e.g., for more efficient tracking and/or labeling of the associated dataset, thereby improving user experience and mitigating errors during data processing).

In some implementations, the model generation platform 102 determines the storage location of the dataset by comparing the performance metric for the dataset with a threshold metric for the respective storage medium. In some implementations, the model generation platform 102 stores a dataset (and/or a portion thereof) within a given storage medium based on a determination that the performance metric is less than the threshold metric (e.g., in the case of the performance metric corresponding to a storage size and the threshold metric corresponding to a maximum storage size). Additionally or alternatively, the model generation platform 102 stores the dataset within the given storage medium based on a determination that the performance metric is greater than the threshold metric. By determining that the performance metric is consistent with the threshold metric, the model generation platform 102 can ensure that the storage medium is suitable for storing the associated data. By doing so, the model generation platform 102 can handle large or complex datasets from various sources and store such data for further processing and use.

In some implementations, the model generation platform 102 can generate a warning (e.g., for display on the GUI of an associated user device) based on a determination that a storage medium selected by the user is incompatible with the associated dataset. For example, the model generation platform 102 can determine that a selected location (e.g., associated with the storage selection 512) includes a threshold metric that is less than the performance metric of the dataset associated with the data source selection 510 (e.g., when the remaining available storage size associated with the storage medium is less than the storage size requirement of the associated dataset). As such, the model generation platform 102 can determine to reject the user request for selection of the associated storage medium and/or generate an associated warning message for display on the GUI. In some implementations, the model generation platform 102 can automatically determine an associated storage location based on the performance metric of the selected dataset.

Data exploration 420 can include selection, visualization, and/or specification of data (e.g., of training data for generation of a machine learning model). To illustrate, data exploration 420 enables a user to select data (e.g., at an operation 422), such as within a GUI associated with the server system 120. For example, the model generation platform 102 receives a request for generation of a machine learning model based on a subset of datasets stored within the server system 120. The request can include an indication of a subset of the dataset (e.g., to be used as training data for generation or tuning of an associated machine learning model). To illustrate, the request can include an indication of particular rows (e.g., records), columns, pages, paragraphs, or other sections of a given dataset. For example, the model generation platform 102 can generate selected data 442a, selected data 442b, selected data 442c, and/or selected data 442d, according to various user requests/selections. The model generation platform 102 can store this selected data within a suitable storage medium, as determined by respective performance metrics of the selected data and the threshold metrics of the respective storage media (e.g., as discussed in relation to the operation 416).

In some implementations, the model generation platform 102 enables visualization of the selected data (e.g., by slicing the data according to particular rows, columns, or coordinates). In some implementations, the model generation platform 102 stores this selected data in a different storage medium than for the associated complete datasets (e.g., according to performance metrics and associated threshold metrics). For example, the model generation platform 102 can determine to store one or more subsets of datasets within primary memory associated with a server of the server system 120, where the primary memory includes improved efficiency or speed as compared to the secondary memory. For example, the model generation platform 102 stores the subset of the datasets within RAM associated with a server, where the data stored within the RAM is efficiently accessible from a client device (e.g., via an associated API). By dynamically storing selected data according to performance requirements associated with the storage of this data, the model generation platform 102 enables flexible, modular, and efficient processing of the data.

Furthermore, by storing selected data within an accessible memory (e.g., a secondary memory), the model generation platform 102 can maintain the full dataset (e.g., the dataset 414a), as extracted from the associated database (e.g., the database 412b), in an unchanged, unsliced, or unmodified form within another suitable storage medium (e.g., a secondary storage medium, such as an HDD, or a distributed storage medium associated with the server system 120 and/or other servers of the model generation platform 102). By doing so, the model generation platform 102 enables parallel selection, modification, and use of the same dataset by multiple users and/or for different use cases. For example, the model generation platform 102 can store a modified, sliced version of a given dataset (e.g., according to a user's model generation request) within a separate primary memory, while maintaining an unadulterated form of the complete dataset within the secondary memory. Furthermore, by storing the subset of the dataset within primary memory, the model generation platform 102 can improve the efficiency, speed and/or performance of manipulating the selected data, thereby improving generation, training, and/or use of associated machine learning model.

Figure 6:
FIG. 6 shows an illustrative representation of a GUI for visualizing heterogeneous input data, in accordance with some implementations of the present technology.

FIG. 6 shows an illustrative representation of a GUI 600 for visualizing heterogeneous input data, in accordance with some implementations of the present technology. For example, the model generation platform 102, via the GUI 600, enables selection of visualization formats associated with the data (e.g., as selected by a user using the dataset selector 502 and/or the dataset selector 504). To illustrate, the visualization format selector 612 (e.g., through corresponding user control(s)) enables user determination of a visualization format for the associated data. The visualization format can include an indication of a plot type for presentation of the underlying data (e.g., a selection of a pie chart, a bar chart, a line chart, a scatter plot, a table, etc.). The visualization format can include a specification, schema, or format for graphical presentation of data associated with one or more datasets. According to this selection, the model generation platform 102 can generate the associated visualizations (e.g., visualization 614a, visualization 614b, or visualization 614c). The model generation platform 102 can, in some implementations, generate various visualizations of the same data simultaneously. In some implementations, visualization (e.g., visual indications of portions of data) include data arising from different data sources (e.g., associated with different data selectors, such as dataset selector 502 and dataset selector 504). The model generation platform 102 can store these visualizations within an associated storage medium (e.g., based on respective performance metrics for the visualizations and threshold metrics for the storage medium).

The model generation platform 102 enables data imputation 430. For example, at the operation 432, the model generation platform 102 enables imputation (e.g., cleaning, modification, and/or substitution) of data associated with the datasets (e.g., including selected data). Data imputation can include the replacement of missing or invalid data (e.g., null values) with substituted values. Data imputation can include unit imputation (e.g., substitution for a datapoint) and/or item imputation (e.g., substitution for a component of the datapoint). For example, model generation platform 102 employs listwise deletion of missing data (e.g., where any records with a missing value are deleted). In some implementations, model generation platform 102 can execute single imputation (e.g., including imputation of a single dataset, such as via a hot-deck, cold-deck, mean substitution, non-negative matrix factorization, and/or regression). The model generation platform 102 can execute multiple imputation (e.g., by averaging outcomes across multiple imputed datasets). For example, the model generation platform 102 can impute data, analyze the data, and pool the data (e.g., by calculating the mean, variance, and confidence interval of the variable of concern). In some implementations, the model generation platform 102 enables a user to determine an imputation algorithm via an associated GUI, thereby enabling data imputation in a low-code manner. By executing data imputation 130, the model generation platform 102 enables improved accuracy in the generation of data for machine learning model training, thereby enhancing the quality of the generated machine learning model.

In some implementations, the model generation platform 102 can execute data science operations (e.g., data science 440, as shown in FIG. 4). Data science operations can include operations that enable analysis, processing, and/or predictions based on associated data. The model generation platform 102 can generate (e.g., at the operation 444) a machine learning model based on the selected data (e.g., the selected data 442*a*, 442*b*, 442*c*, and 442*d*). For example, the model generation platform 102 generates and/or updates model parameters 446 (e.g., weights, biases, or activation functions) of a given machine learning model (e.g., as discussed in relation to FIG. 8). For example, the model generation platform 102 can execute a training algorithm based on training data that includes information from a variety of data formats and/or sources (e.g., from database 412*a* and 412*b*) and/or from a variety of portions of the associated datasets. By doing so, the model generation platform 102 enables the generation and/or training of machine learning models from a diverse set of data, thereby improving the accuracy and flexibility of the associated machine learning model.

The model generation platform 102 can execute data operations 450. The data operations 450 can include the deployment of the model (e.g., at the operation 452). The deployment of the model can include storage of the model parameters in a suitable storage medium (e.g., as associated with the server system 120). The model generation platform 102 can generate an application that enables use of the machine learning model. For example, the application can receive (e.g., from a user through an associated API) input data and provide the input data to the machine learning model. Based on the input data, the machine learning model can determine output data and transmit this output data to the user. For example, the model generation platform 102 enables a user to select a generated machine learning model (e.g., via a model selection using a first API) using a model identifier as well as input data from a database (e.g., via a second API) for generation of output data. By doing so, the model generation platform 102 can provide predictions or other information on the basis of the generated machine learning models. To illustrate, the model generation platform 102 can provide predictions of a likelihood of a particular user of using a given banking product.

Process for Generating Machine Learning Models Based on Heterogeneous Data

FIG. 7 shows a flow diagram illustrating a process 700 for generating a machine learning model based on heterogeneous input data based on performance-dependent storage of selected data, in accordance with some implementations of the present technology.

At act 702, process 700 can receive a first request including a database identifier. For example, the model generation platform 102 receives, via a user interface of a client device associated with a user, a first request comprising a database identifier associated with a database. As an illustrative example, the model generation platform 102 receives a request for retrieval of user information associated with user accounts of a database system (e.g., associated with banking customers). The model generation platform 102 can generate the request using an API call on a client device to an application residing on a server system. By doing so, a user can specify the information that is desired for generation of machine learning models (e.g., via a database of a plurality of databases).

At act 704, process 700 can obtain a dataset via an AI associated with the database identifier. For example, the model generation platform 102 obtains, via an API associated with the database identifier, a dataset. As an illustrative example, the model generation platform 102 can retrieve a dataset from the database identified by the database identifier. The dataset can be associated with a particular format or a particular structure (e.g., a CSV including financial account information associated with users of a banking system). By doing so, the model generation platform 102 can retrieve heterogeneous information from a variety of databases as specified by the user.

At act 706, process 700 can store the dataset in a data structure within a first storage medium. For example, the model generation platform 102 stores the dataset in a data structure within a first storage medium of the system. As an illustrative example, the model generation platform 102 can store the dataset within a secondary memory device capable of storing large sizes or amounts of data. For example, the model generation platform 102 can store the retrieved dataset within an HDD or a SSD, such that data associated with the database can be stored with few storage limitations (e.g., for use by many users or for many use cases).

At act 708, process 700 can receive an indication of a portion of the dataset. For example, the model generation platform 102 receives, via the user interface of the client device, an indication of a portion of the dataset. As an illustrative example, the model generation platform 102 can determine a subset of the stored dataset for generation of the machine learning model and/or visualization of the data. For example, the model generation platform 102 can receive, from the client device via the graphical user interface, a selection (e.g., of rows, columns, and/or other portions of the data) that indicates a portion of the dataset to be further processed. By doing so, the model generation platform 102 enables targeted processing of the retrieved data (e.g., for generation and tuning of training data for a target machine learning model).

In some implementations, process 700 can determine the indication of the portion of the dataset based on an indication of a visualization of data. For example, the model generation platform 102 receives, via a graphical user interface corresponding to the user interface, an indication of a data visualization format. The model generation platform 102 can generate, via the graphical user interface and according to the data visualization format, a visual indication of the portion of data of the database. The model generation platform 102 can receive, via the graphical user interface, an indication of the portion of data of the database. As an illustrative example, the model generation platform 102 can generate scatter plots, pie charts, or other data visualizations. Based on these visualizations, the model generation platform 102 can receive a selection of data (e.g., individual data points and/or slices of a pie chart) via a GUI of a client device. By doing so, the model generation platform 102 improves the ability of a user to select data in a low-code environment.

At act 710, process 700 can determine a metric for the portion of the dataset. For example, the model generation platform 102 determines an estimated performance metric for the portion of the dataset, wherein the estimated performance metric indicates an estimated resource usage for storing the portion of the dataset. As an illustrative example, the model generation platform 102 can determine a storage size associated with storing the dataset or other attributes characterizing storage requirements associated with the data (e.g., security requirements). By doing so, the model generation platform 102 can determine a second storage location for the data for more efficient data retrieval and to enable processing of the same dataset by multiple users and/or for different generated machine learning models.

At act 712, process 700 can compare the metric with a threshold metric associated with a second storage medium. For example, the model generation platform 102 compares the estimated performance metric with a threshold metric associated with a second storage medium of the system. At act 714, process 700 can determine whether the metric is less than the threshold metric. As an illustrative example, the model generation platform 102 determines whether storage requirements associated with the selected dataset (e.g., the subset of the dataset) are compatible with a second storage medium (e.g., a primary storage medium associated with faster read/write speeds and/or associated with a particular client device). As such, the model generation platform 102 can improve the efficiency and modularity of processing the data (e.g., to generate the machine learning model) in situations where the dataset can be stored in a more efficient storage location. Additionally or alternatively, at act 722, based on determining that the metric is greater than or equal to the threshold metric, process 700 can generate an error message for display on a GUI within the client device. In such a case, the model generation platform 102 can determine that the chosen subset of data cannot be stored within a primary storage medium due to associated storage constraints.

In some implementations, process 700 can determine a storage size associated with the dataset and compare this storage size with a threshold storage size associated with the corresponding storage medium. For example, using the indication of the portion of the dataset, the model generation platform 102 can determine a storage size associated with the estimated performance metric. The model generation platform 102 can determine a maximum storage size associated with the second data storage medium. The model generation platform 102 can determine whether the storage size is less than the maximum storage size. As an illustrative example, the model generation platform 102 can determine whether a given storage medium is capable of storing the selected data prior to storage of the portion of the dataset within this storage medium. By doing so, the model generation platform 102 can prevent data storage errors or similar issues.

At act 716, process 700 can generate a representation of the portion of the dataset within the second storage medium. In response to determining that the estimated performance metric is less than the threshold metric, the model generation platform 102 can generate, within the second storage medium associated with the user, a representation of the portion of the dataset. As an illustrative example, the model generation platform 102 can store a representation of the portion of the dataset (e.g., a slice, a visualization, or a data structure representing the selected portion of the dataset) within the second storage medium (e.g., a primary memory device). By doing so, the model generation platform 102 can generate the selected data (e.g., for generation of a machine learning model) within a user or use case-specific storage medium, thereby enabling improved efficiency, flexibility, and modularity of the model generation platform.

At act 718, process 700 can receive a second request for generation of a machine learning model. For example, a model generation platform 102 receives, via the user interface, a second request for generation of a machine learning model associated with a subset of the portion of the dataset. As an illustrative example, the model generation platform

102 can receive a request to train a machine learning model (e.g., a convolutional neural network, an artificial neural network, and/or another machine learning model) for predictions. For example, the model generation platform 102 can receive a request from a user to generate a classification machine learning model for classification of a user based on a likelihood of making payments associated with a credit card, such as one associated with a banking account.

At act 720, process 700 can generate the machine learning model. For example, the model generation platform 102, in response to the second request, generates the machine learning model, wherein the machine learning model is trained using training data comprising the subset of the portion of the dataset, and wherein parameters associated with the machine learning model are stored in the second storage medium. The model generation platform 102 can generate the machine learning model according to the user's selected training data, as stored on a suitable storage medium. For example, the model generation platform 102 can generate the classification machine learning model for evaluation of users of a bank account system (e.g., as associated with the database).

In some implementations, process 700 can generate output data based on providing input data to the machine learning model. For example, the model generation platform 102 receives, via the user interface, a model selection and a data selection, wherein the model selection comprises an indication of the machine learning model, and wherein the data selection indicates a portion of data of the database. The model generation platform 102 can obtain, via the API, input data matching the data selection. The model generation platform 102 can provide the input data to the machine learning model to generate output data. The model generation platform 102 can generate the output data for display on the user interface. As an illustrative example, the model generation platform 102 can generate output data (e.g., a prediction associated with a user's likelihood to execute an action, such as a payment of a transaction) based on input data (e.g., a user's bank account-related activity, such as previous transactions). By doing so, model generation platform 102 enables processing, analysis, and visualization of data using the machine learning model generated on the basis of heterogeneous input data.

In some implementations, process 700 can train the model based on data associated with data of a second database. For example, the model generation platform 102 can receive a third request comprising a second database identifier associated with a second database. The model generation platform 102 can obtain, via a second API associated with the second database identifier, a second dataset. The model generation platform 102 can receive, via the user interface, an indication of a portion of the second dataset. The model generation platform 102 can train the machine learning model using the training data comprising the subset of the portion of the dataset and a subset of the portion of the second dataset. For example, model generation platform 102 can obtain further data from another database for training the generated machine learning model. By doing so, the model generation platform 102 can dynamically update generated machine learning models based on data from different systems and/or databases.

In some implementations, process 700 can transform data from a first format to a second format for storage within the second storage medium. For example, the model generation platform 102 determines a first format associated with the dataset, wherein the first format indicates a first structure type of the dataset. The model generation platform 102 can determine a second format associated with the second dataset, wherein the second format indicates a second structure type of the second dataset. The model generation platform 102 can generate, within the second storage medium, a modified dataset associated with the second dataset, wherein the modified dataset is of the first format. As an illustrative example, the model generation platform 102 can convert data into a uniform format (e.g., a CSV format or another structured data format), thereby enabling standardization of unstructured data for processing by the machine learning model. By doing so, the model generation platform 102 enables processing of heterogeneous data of varying formats, thereby improving the flexibility of the model generation platform 102.

In some implementations, process 700 can generate a second machine learning model based on a request from a second client device. For example, the model generation platform 102 receives, via a second user interface of a second client device associated with a second user, an indication of a second portion of the dataset. The model generation platform 102 can determine a second estimated performance metric associated with the second portion of the dataset. The model generation platform 102 can compare the second estimated performance metric with a second threshold metric associated with a third data storage medium of the system. In response to determining that the estimated performance metric is less than the second threshold metric, the model generation platform 102 can generate, within a third storage medium associated with the second user, a representation of the second portion of the dataset. The model generation platform 102 can generate a second machine learning model trained using a subset of the second portion of the dataset. The model generation platform 102 can generate machine learning models for various users, while enabling each user to control, manipulate, and process data in a different manner (e.g., by storing user-specific versions of the requested data in different storage media).

Figure 8:
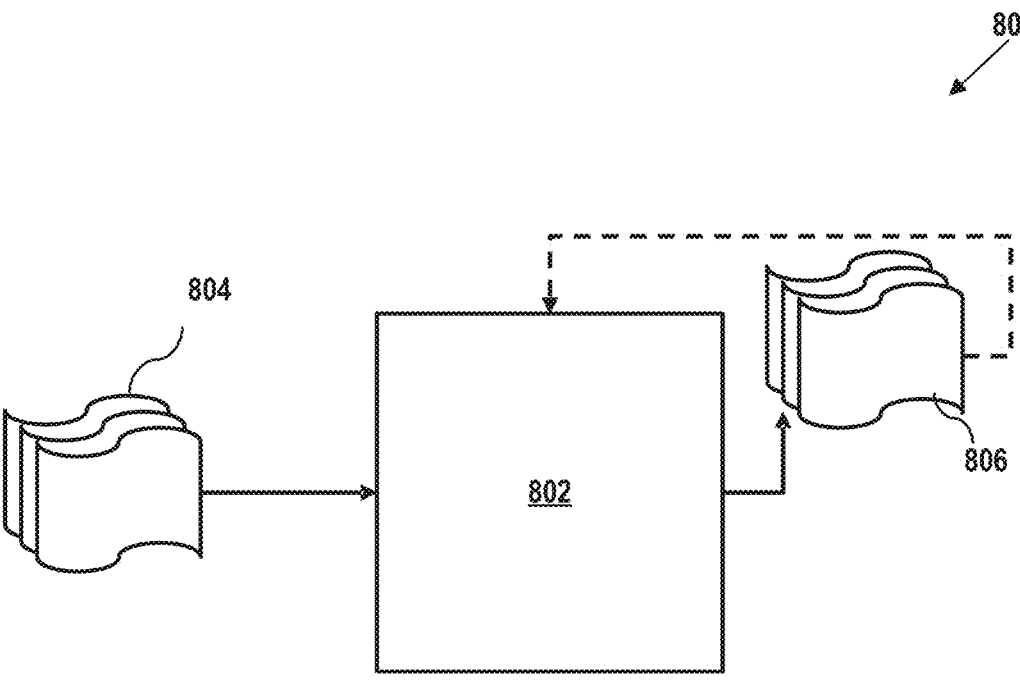
FIG. 8 shows a diagram of an artificial intelligence (AI) model, in accordance with some implementations of the present technology.

FIG. 8 shows a diagram of an AI model, in accordance with some implementations of the present technology. AI model 800 is shown. In some implementations, AI model 800 may be any AI model. In some implementations, AI model 800 can be part of, or work in conjunction with, server computing device 306 (FIG. 3). For example, server computing device 306 can store a computer program that can use information obtained from AI model 800, provide information to AI model 800, or communicate with AI model 800. In other implementations, AI model 800 may be stored in database 308 and may be retrieved by server computing device 306 to execute/process information related to AI model 800, in accordance with some implementations of the present technology.

In some implementations, AI model 800 may be a machine learning model 802. Machine learning model 802 can include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

As an example, with respect to FIG. 8, machine learning model 802 can take inputs 804 and provide outputs 806. In one use case, outputs 806 may be fed back to machine learning model 802 as input to train machine learning model 802 (e.g., alone or in conjunction with user indications of the accuracy of outputs 806, labels associated with the inputs, or other reference feedback information). In another use case, machine learning model 802 may update its configurations (e.g., weights, biases, or other parameters) based on its assessment of its prediction (e.g., outputs 806) and reference feedback information (e.g., user indication of accuracy, reference labels, or other information). In another use case, where machine learning model 802 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 802 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware-implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include additional elements to those implementations noted above or may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right after filing this application to pursue such additional claim forms, either in this application or in a continuing application.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A non-transitory, computer-readable storage medium for dynamically generating a machine learning model based on dynamically-stored training data, wherein the non-transitory, computer-readable storage medium comprises instructions thereon that, when executed by at least one data processor of a system, cause the system to:

determine, by executing a server utility application for a server system, an estimated performance metric for a portion of a dataset indicating an estimated resource usage for storing the portion of the dataset;

dynamically determine a threshold metric associated with a second storage medium of the server system, wherein the threshold metric includes a dynamically determined performance-related metric for the second storage medium comprising at least one of: (1) an estimated read-write speed, (2) a volatility value, or (3) a remaining available storage value;

determine, by comparing the estimated performance metric with the threshold metric associated with the second storage medium, a storage medium for storage of a representation of the portion of the dataset;

in response to determining that the estimated performance metric is less than the threshold metric, generate, within the determined storage medium comprising the second storage medium, the representation of the portion of the dataset;

in response to determining that the estimated performance metric is greater than or equal to the threshold metric, generate, within the determined storage medium comprising a third storage medium that is different from the second storage medium, the representation of the portion of the dataset; and generate the machine learning model that is trained using training data comprising a subset of the portion of the dataset, wherein parameters associated with the machine learning model are stored in the determined storage medium based on the estimated performance metric.

2. The non-transitory, computer-readable storage medium of claim 1, wherein the instructions cause the system to:

receive a model selection and a data selection of a data store, wherein the model selection comprises an indication of the machine learning model, and wherein the data selection indicates a portion of data of the data store;

obtain input data matching the data selection;

provide the input data to the machine learning model to generate output data; and configure the output data for display on a user interface.

3. The non-transitory, computer-readable storage medium of claim 2, wherein the instructions for receiving the data selection cause the system to:

receive, via a graphical user interface corresponding to the user interface, an indication of a data visualization format;

generate, via the graphical user interface and according to the data visualization format, a visual indication of the portion of data of the data store; and receive, via the graphical user interface, an indication of the portion of data of the data store.

4. The non-transitory, computer-readable storage medium of claim 1, wherein the instructions for comparing the estimated performance metric with the threshold metric cause the system to:

using an indication of the portion of the dataset, determine a storage size associated with the estimated performance metric;

determine a maximum storage size associated with the second storage medium; and determine whether the storage size is less than the maximum storage size.

5. The non-transitory, computer-readable storage medium of claim 1, wherein the instructions cause the system to:

obtain a second dataset;

receive an indication of a portion of the second dataset; and train the machine learning model using the training data comprising the subset of the portion of the dataset and a subset of the portion of the second dataset.

6. The non-transitory, computer-readable storage medium of claim 5, wherein the instructions cause the system to:

determine a first format associated with the dataset, wherein the first format indicates a first structure type of the dataset;

determine a second format associated with the second dataset, wherein the second format indicates a second structure type of the second dataset; and generate, within the determined storage medium, a modified dataset associated with the second dataset, wherein the modified dataset is of the first format.

7. The non-transitory, computer-readable storage medium of claim 5, wherein the instructions cause the system to:

receive, via a second user interface of a second client device associated with a second user, an indication of a second portion of the dataset;

determine a second estimated performance metric associated with the second portion of the dataset;

compare the second estimated performance metric with a second threshold metric associated with the third storage medium of the server system;

in response to determining that the estimated performance metric is less than the second threshold metric, generate, within the third storage medium associated with the second user, a representation of the second portion of the dataset; and generate a second machine learning model trained using a subset of the second portion of the dataset.

8. A system for dynamically generating a machine learning model based on dynamically-stored training data, comprising:

at least one hardware processor; and at least one non-transitory memory storing instructions, which, when executed by the at least one hardware processor, cause the system to:

determine, by executing a server utility application for a server system, a metric for a portion of a dataset indicating an estimated parameter for storing the portion of the dataset;

dynamically determine a threshold metric associated with a second storage medium associated with the server system, wherein the threshold metric includes a dynamically determined performance-related metric for the second storage medium comprising at least one of: (1) an estimated read-write speed, (2) a volatility value, or (3) a remaining available storage value;

determine, by comparing the metric with the threshold metric associated with the second storage medium, a storage medium for storage of a representation of the portion of the dataset;

in response to determining that the metric satisfies the threshold metric, configure for generation, within the determined storage medium comprising the second storage medium, the representation of the portion of the dataset;

in response to determining that the metric does not satisfy the threshold metric, generate, within the determined storage medium comprising a third storage medium that is different from the second storage medium, the representation of the portion of the dataset;

generate the machine learning model that is trained using training data comprising a subset of the portion of the dataset, wherein parameters associated with the machine learning model are stored in the determined storage medium based on the metric.

9. The system of claim 8, wherein the instructions cause the system to:

receive a model selection and a data selection of a data store, wherein the model selection comprises an indication of the machine learning model, and wherein the data selection indicates a portion of data of the data store;

obtain input data matching the data selection;

provide the input data to the machine learning model to generate output data; and configure the output data for display on a user interface.

10. The system of claim 9, wherein the instructions for receiving the data selection cause the system to:

receive, via a graphical user interface corresponding to the user interface, an indication of a data visualization format;

generate, via the graphical user interface and according to the data visualization format, a visual indication of the portion of data of the data store; and receive, via the graphical user interface, an indication of the portion of data of the data store.

11. The system of claim 8, wherein the instructions for comparing the metric with the threshold metric cause the system to:

using an indication of the portion of the dataset, determine a storage size associated with the metric;

determine a maximum storage size associated with the second storage medium; and determine whether the storage size is less than the maximum storage size.

12. The system of claim 8, wherein the instructions cause the system to:

obtain a second dataset;

receive an indication of a portion of the second dataset; and train the machine learning model using the training data comprising the subset of the portion of the dataset and a subset of the portion of the second dataset.

13. The system of claim 12, wherein the instructions cause the system to:

determine a first format associated with the dataset, wherein the first format indicates a first structure type of the dataset;

determine a second format associated with the second dataset, wherein the second format indicates a second structure type of the second dataset; and generate, within the determined storage medium, a modified dataset associated with the second dataset, wherein the modified dataset is of the first format.

14. The system of claim 12, wherein the instructions cause the system to:

receive, via a second user interface of a second client device associated with a second user, an indication of a second portion of the dataset;

determine a second metric associated with the second portion of the dataset;

compare the second metric with a second threshold metric associated with the third storage medium of the server system;

in response to determining that the metric is less than the second threshold metric, generate, within the third storage medium associated with the second user, a representation of the second portion of the dataset; and generate a second machine learning model trained using a subset of the second portion of the dataset.

15. A method for dynamically generating a machine learning model based on dynamically-stored training data, comprising:

determining, by executing a server utility application for a server system, a metric for a portion of a dataset indicating an estimated parameter associated with storing the portion of the dataset;

dynamically determine a threshold metric associated with a second storage medium of the server system, wherein the threshold metric includes a dynamically determined performance-related metric for the second storage medium comprising at least one of: (1) an estimated read-write speed, (2) a volatility value, or (3) a remaining available storage value;

determine, by comparing the metric with the threshold metric associated with the second storage medium, a storage medium for storage of a representation of the portion of the dataset;

in response to determining that the metric is less than the threshold metric, generating, within the determined storage system comprising the second storage medium, the representation of the portion of the dataset;

in response to determining that the metric is greater than or equal to the threshold metric, generate, within the determined storage medium comprising a third storage medium that is different from the second storage medium, the representation of the portion of the dataset; and generating the machine learning model that is trained using training data comprising a subset of the portion of the dataset, wherein parameters associated with the machine learning model are stored in the determined storage medium based on the metric.

16. The method of claim 15, comprising:

receiving a model selection and a data selection of a data store, wherein the model selection comprises an indication of the machine learning model, and wherein the data selection indicates a portion of data of the data store;

obtaining input data matching the data selection;

providing the input data to the machine learning model to generate output data; and generating the output data for display on a user interface.

17. The method of claim 16, wherein receiving the data selection comprises:

receiving, via a graphical user interface corresponding to the user interface, an indication of a data visualization format;

generating, via the graphical user interface and according to the data visualization format, a visual indication of the portion of data of the data store; and receiving, via the graphical user interface, an indication of the portion of data of the data store.

18. The method of claim 15, wherein comparing the metric with the threshold metric comprises:

using an indication of the portion of the dataset, determining a storage size associated with the metric;

determining a maximum storage size associated with the second storage medium; and determining whether the storage size is less than the maximum storage size.

19. The method of claim 15, comprising:

obtaining a second dataset;

receiving an indication of a portion of the second dataset; and training the machine learning model using the training data comprising the subset of the portion of the dataset and a subset of the portion of the second dataset.

20. The method of claim 19, comprising:

determining a first format associated with the dataset, wherein the first format indicates a first structure type of the dataset;

determining a second format associated with the second dataset, wherein the second format indicates a second structure type of the second dataset; and generating, within the determined storage medium, a modified dataset associated with the second dataset, wherein the modified dataset is of the first format.

* * * * *